(12) United States Patent
Lhota et al.

(10) Patent No.: US 8,381,421 B2
(45) Date of Patent: Feb. 26, 2013

(54) FRAME FOR ATTACHING AN IMPLEMENT TO THE WHEELS OF A VEHICLE

(75) Inventors: Thomas E. Lhota, Oxford, MI (US); Danny T. Miller, Metamora, MI (US)

(73) Assignee: Snap-N-Go-Products, Metamora, MI (US)

( * ) Notice: Subject to any disclaimer, the term of this patent is extended or adjusted under 35 U.S.C. 154(b) by 178 days.

(21) Appl. No.: 12/796,029

(22) Filed: Jun. 8, 2010

(65) Prior Publication Data

US 2011/0297406 A1     Dec. 8, 2011

(51) Int. Cl.
*E01H 5/04* (2006.01)
(52) U.S. Cl. ............... 37/231; 37/263; 37/270; 280/296
(58) Field of Classification Search .................... 37/231, 37/296, 263, 270; 152/216; 280/156, 157, 280/855, 856, 13, 296
See application file for complete search history.

(56) References Cited

U.S. PATENT DOCUMENTS

| | | | | |
|---|---|---|---|---|
| 885,447 A * | 4/1908 | Cross | ............................ | 188/262 |
| 1,918,771 A * | 7/1933 | Meyer | ............................ | 37/231 |
| 2,163,279 A * | 6/1939 | Henry et al. | ................... | 37/231 |
| 2,362,374 A | 11/1944 | Heppner | | |
| 2,409,552 A * | 10/1946 | Donnellan | ..................... | 244/63 |
| 3,138,392 A | 6/1964 | Holland | | |
| 3,279,824 A | 10/1966 | Brisbin et al. | | |
| 3,349,507 A | 10/1967 | Payne | | |
| 3,415,542 A * | 12/1968 | Urich | .......................... | 280/460.1 |
| 3,608,216 A | 9/1971 | Prescott | | |
| 3,760,516 A * | 9/1973 | Billingsley | ..................... | 37/231 |
| 4,023,287 A * | 5/1977 | de Brito | .......................... | 37/231 |
| 4,873,775 A | 10/1989 | Richey | | |
| 4,944,104 A | 7/1990 | Kowalczyk | | |
| 5,136,795 A * | 8/1992 | Rosenberg | ..................... | 37/233 |
| 5,485,690 A | 1/1996 | MacQueen | | |
| 5,509,219 A | 4/1996 | Mecca | | |
| 5,666,747 A * | 9/1997 | MacQueen | ..................... | 37/273 |
| 5,806,214 A * | 9/1998 | Behrens et al. | ................. | 37/231 |
| 6,009,642 A * | 1/2000 | Nugent | .......................... | 37/231 |
| 6,012,240 A * | 1/2000 | Klug et al. | ...................... | 37/231 |
| 6,050,008 A * | 4/2000 | Doornek et al. | ................ | 37/231 |
| 6,516,544 B1 | 2/2003 | Matisz et al. | | |
| 7,617,882 B1 * | 11/2009 | Street | ............................ | 172/817 |
| 7,661,210 B2 * | 2/2010 | Shepherd | ........................ | 37/232 |
| 8,033,036 B1 * | 10/2011 | Turnbull | ......................... | 37/270 |
| 2010/0088930 A1 * | 4/2010 | Brame et al. | .................... | 37/231 |

OTHER PUBLICATIONS

PCT International Search Report; PCT/US2011/039379; dated: Oct. 11, 2011; 2 pages.

* cited by examiner

*Primary Examiner* — Jamie L McGowan
(74) *Attorney, Agent, or Firm* — Reising Ethington P.C.

(57) ABSTRACT

A frame for mounting an implement to a vehicle having wheels includes elongated frame members for supporting the implement and drive members that are mounted on the elongated frame members. The drive members contact the wheels of the vehicle and receive a driving force from the wheels. The frame is mounted to the vehicle only on the vehicle wheels, and is able to pivot to follow the steering motion of the vehicle wheels.

16 Claims, 5 Drawing Sheets

FRAME FOR ATTACHING AN IMPLEMENT TO THE WHEELS OF A VEHICLE

FIELD OF THE INVENTION

The device relates to a frame for attaching an implement to the wheels of a vehicle.

BACKGROUND OF THE INVENTION

An implement such as a snow plow is normally attached to a vehicle by a heavy cumbersome frame that is bolted and may be partially welded to the frame of the vehicle. Mounting the implement frame to the vehicle may require a considerable amount of time and effort, and the vehicle may have to be put onto a lift in order to make the necessary connections. Once the implement frame is attached, the implement itself has to be mounted on the frame, and a variety of tools are normally required to secure the implement to the frame. After the task involving the implement has been performed, the procedure has to be reversed in order to remove the implement and the implement frame from the vehicle.

SUMMARY OF THE INVENTION

A frame for attaching an implement to a vehicle mounts on the wheels of the vehicle. Drive rollers on the frame are in contact with the wheels of the vehicle and transmit drive force from the wheels to the frame. As the wheels of the vehicle turn to steer the vehicle, the frame is able to pivot in response to the turning of the wheels.

DESCRIPTION OF THE PREFERRED EMBODIMENT

Figure 1:
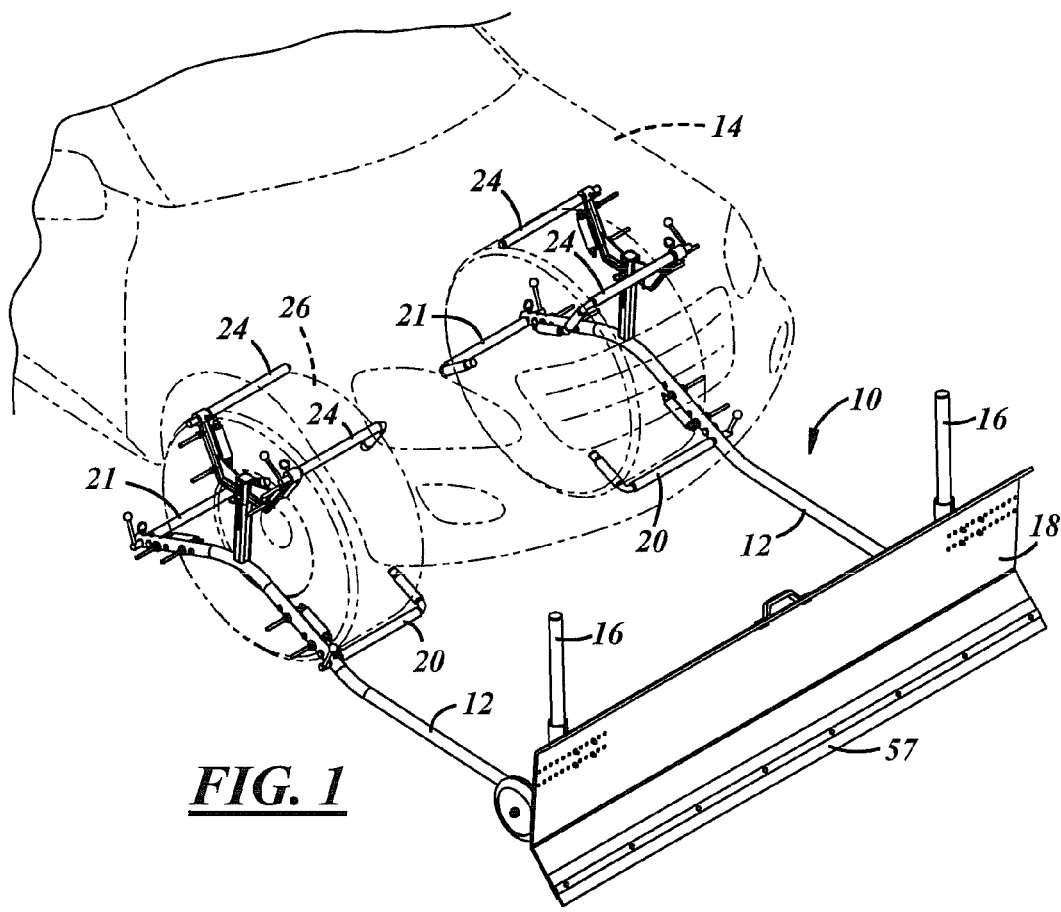
FIG. 1 is a perspective view showing a frame for a snow plow implement mounted on a vehicle.

Turning now to the drawing figures, FIG. 1 shows a frame for mounting an implement to the wheels of a vehicle generally designated by the reference numeral 10. The frame 10 comprises two elongated horizontal frame members 12, one on either side of the vehicle 14. The frame 10 includes front vertical mounting posts 16 on which an implement such as a snow plow 18 may be mounted. A plurality of drive members comprising front drive rollers 20 and rear drive rollers 21, and support rollers 24 are mounted on the rear of the horizontal frame members 12. The front and rear drive rollers 20 and 21 and support rollers 24 are positioned to embrace the outer circumference of a vehicle wheel 26 as shown. It will be understood that as used herein, the term vehicle wheel refers to a steel or other metallic wheel on which a tire has been mounted.

Figure 2:
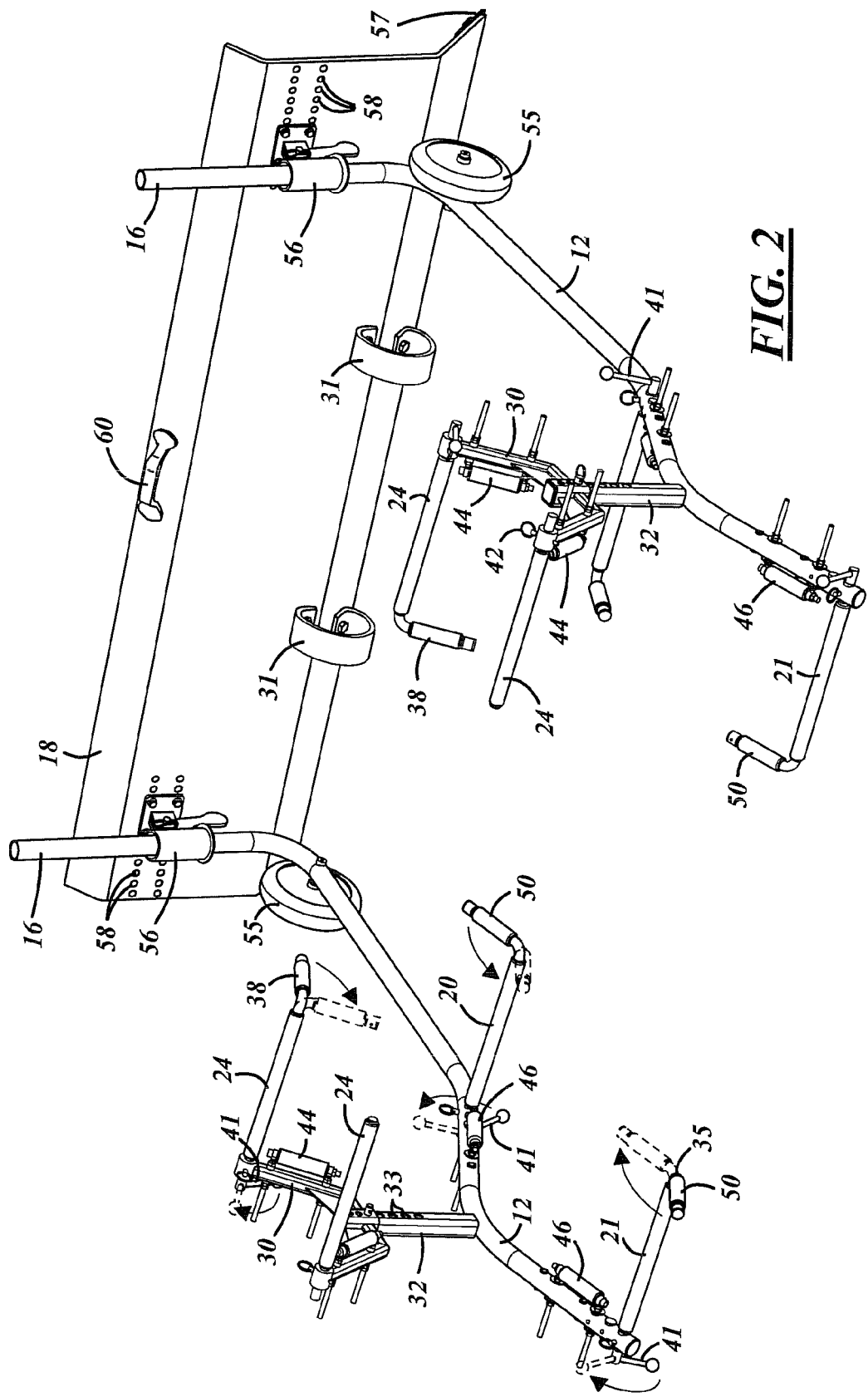
FIG. 2 is a rear perspective view of the frame and the snow plow implement of FIG. 1.

FIG. 2 is a rear perspective view of the plow and frame of FIG. 1. A rear vertical frame post 32 is mounted on each frame member 12 and a support yoke 30 is mounted near the top of the rear vertical frame post. A plurality of holes 33 is provided on the rear vertical frame posts 32 to allow the vertical position of the support yoke 30 to be adjusted as required. The support rollers 24 are mounted on the ends of the support yoke 30 and extend generally horizontally toward the opposite side of the frame 10. Lifting cams 31 may be provided on the lower rear surface of the snow plow 18 to raise the bottom edge of the plow off of the ground when the plow is being driven in the reverse direction as explained more fully below in connection with FIG. 5.

Figure 3A:
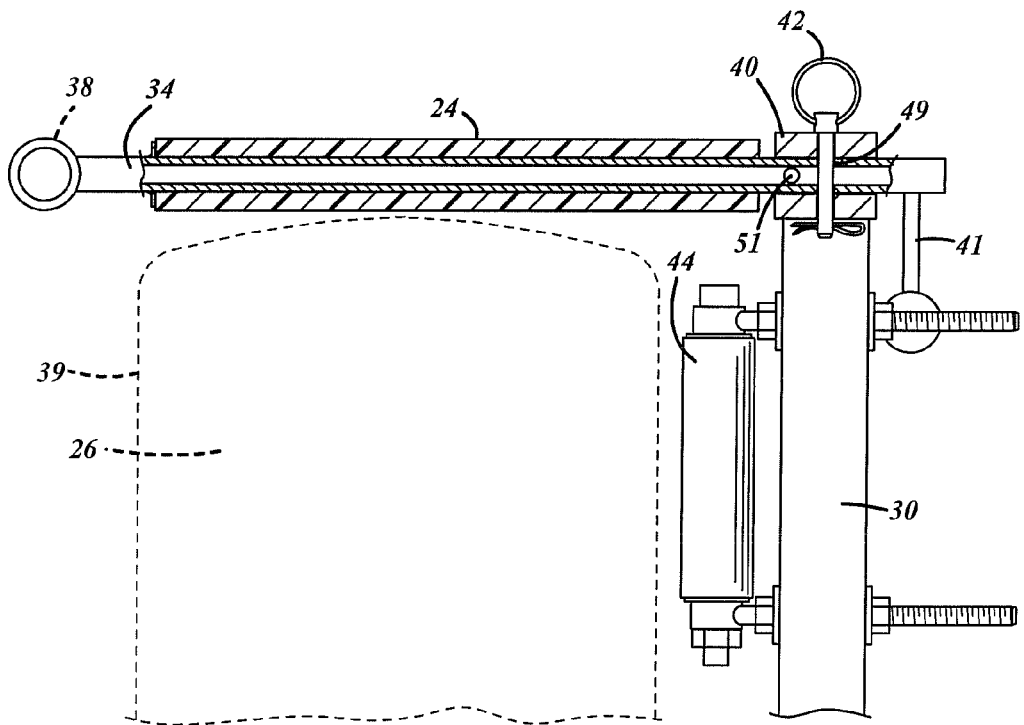
FIGS. 3A and 3B are detail views of a latching roller in an open and a latched position.
Figure 3B:
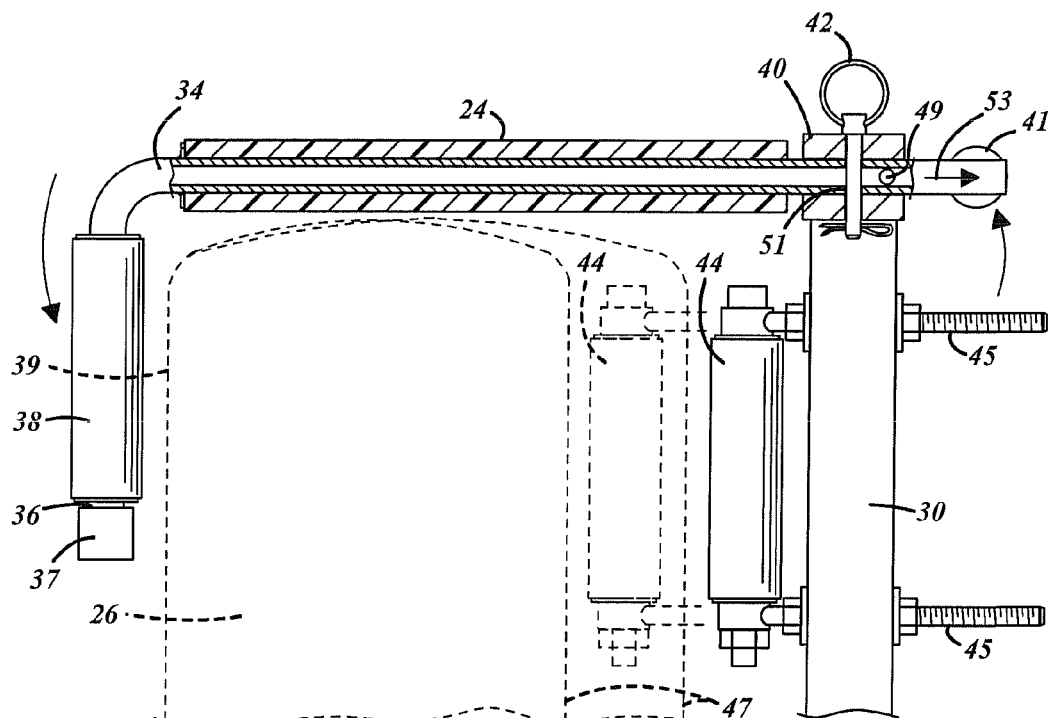

As best seen in FIGS. 3A and 3B, the support rollers 24 are mounted for rotation on support posts 34 to allow the support rollers 24 to rotate freely on the support posts. One end of the support post 34 is bent at approximately a right angle to form a latching post 36. An upper latching roller 38 is mounted on the latching post 36, and a roller retainer 37 is attached to the end of the latching post to hold the latching roller 38 in place. The opposite end of the support post 34 is mounted for rotation in a collar 40 that is mounted on the support yoke 30, and a control handle 41 is attached to the end of the support post. The latching post 36 and the upper latching roller 38 may be rotated in an arc by the control handle 41. In the open position shown in FIG. 3A, the upper latching roller 38 is rotated to a position that is clear of the inner sidewall 39 of the vehicle wheel 26, and the frame members 12 may be removed from or mounted onto the wheel. In the latched position shown in FIG. 3B, the latching roller 38 loosely grips the inner sidewall 39, and prevents the frame member from being removed from the wheel. The spacing roller 44 that is mounted on the yoke 30 spaces the outer sidewall 47 of the vehicle wheel from the yoke 30. The spacing roller 44 is mounted to the yoke by adjustable length bolts 45, allowing the position of the spacing roller 44 to be adjusted toward or away from the latching roller 38 depending on the width of the vehicle wheel 26. A locking pin 42 may be provided to lock the upper latching roller 38 in either the latched or the open position. Two holes 49 and 51 are provided in the support post 34 for receiving the locking pin 42. The two holes 49 and 51 are oriented ninety degrees apart, and are located at different positions along the longitudinal axis of the support post 34. When rotating the latching roller 38 from the open position shown in FIG. 3a to the closed position shown in FIG. 3B, the latching roller 38 is also pulled a short distance relative to the yoke 30 as shown by the arrow 53 to snug the rollers 38 and 44 against the vehicle wheel sidewalls 39 and 47 and to help align the frame members 12 to be parallel to the vehicle wheels.

Referring again to FIG. 2, the two spacing rollers 44 may be mounted on the support yoke 30 as shown. Two additional spacing rollers 46 may be mounted on the elongated frame members 12 between the front and rear drive rollers 20 and 21 as shown. The spacing rollers 44 and 46 ride against the outer sidewall 47 of the vehicle wheels and prevent the wheels from rubbing against the frame members 12. Each drive roller 20 and 21 is mounted on a drive post 35 that is bent at approximately a right angle to support a lower latching roller 50 that is similar in construction to the support post shown in FIG. 3. The angular position of the lower latching roller 50 may be controlled by a control handle 41. The upper and lower latching rollers 38 and 50 in FIG. 1 are all shown rotated to the locked position, preventing the frame from being removed from a vehicle wheel. The latching rollers 38 and 50 on the left side of the frame in FIG. 2 are shown in solid rotated to the open position, allowing the frame to be mounted on or removed from a vehicle wheel, and are shown in phantom rotated to the locked position. The latching rollers 38 and 50 on the right side of the frame in FIG. 2 are shown in the locked position.

As shown in FIG. 2, each elongated frame member 12 has a support wheel 55 mounted near the front portion thereof. The support wheel 55 holds the front of the elongated frame member 12 off of the ground. The front vertical mounting posts 16 may be used to mount an implement such as a snow plow 18 to the frame. In the embodiment shown, the plow 18 has two mounting sleeves 56 that are a sliding fit over the vertical mounting posts 16. The snow plow blade 18 includes a lower edge sweep section 57 best seen in FIG. 1 that rides on the road surface that is being plowed. High spots in the surface are accommodated by the sliding fit of the mounting sleeves 56 on the vertical mounting posts 16 that allow the snow plow blade 18 to ride up and down in response to height variations in the road surface. The sliding fit also allows the vertical mounting posts 16 to pivot relative to the mounting sleeves 56 in response to a steering motion of the vehicle wheels as explained more fully below in connection with FIGS. 6 and 7. The plow 18 includes a number of mounting holes or slots 58 so that the distance between the mounting sleeves 56 may be adjusted to match the distance between the wheels of the vehicle on which the plow is being mounted. The plow 18 includes a handle 60 for lifting and maneuvering the plow into position so that it may be mounted on or removed from the vertical mounting posts 16 by an operator.

Figure 4:
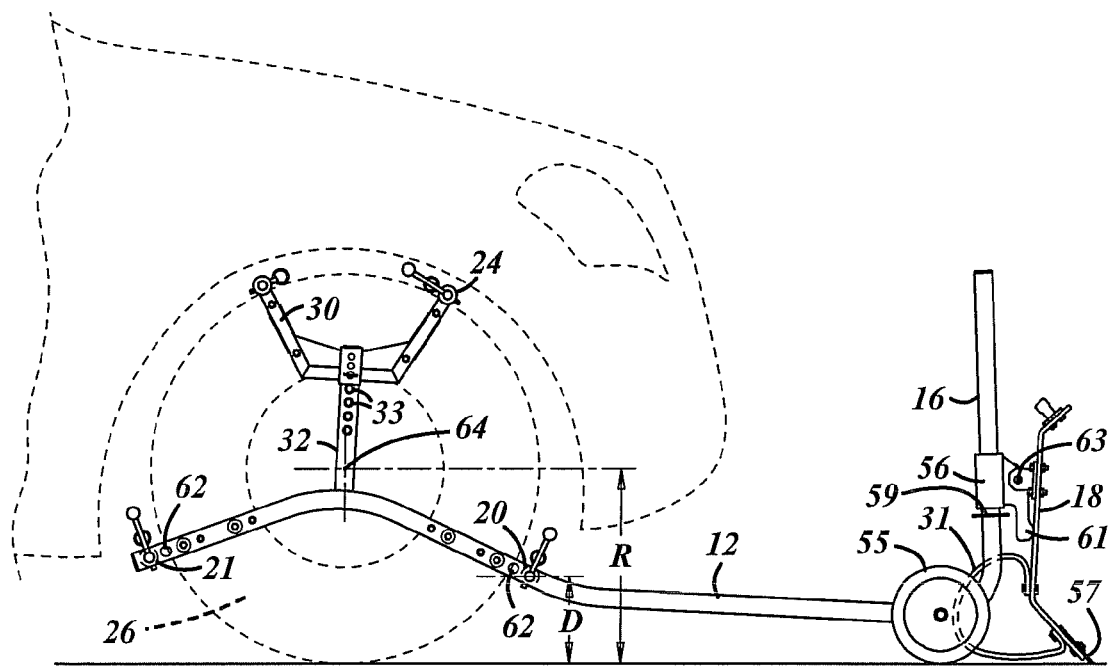
FIG. 4 is a side view of the frame mounted on the wheel of a vehicle.

FIG. 4 is a side view of one elongated frame member 12 mounted on a vehicle wheel 26. In order for the vehicle wheels to impart a driving force to the frame 10, the drive rollers 20 and 21 are positioned below the center 64 of the vehicle wheel 26 so that the distance D is less than R, but greater than one half of R. A minimum of two drive rollers and one support roller is required in order to mount one of the elongated frame members on a vehicle wheel. More rollers can be added and spaced as needed. The elongated frame member 12 is likewise provided with a plurality of mounting holes 62 for the drive posts 35 allowing the spacing between the drive rollers 20 and 21 to be adjusted as required by the dimensions of the vehicle wheels.

The blade is connected to the mounting sleeves 56 by a pivot 63, and the mounting sleeves include a support arm 61. When the blade 18 is in the vertical position as shown in FIG. 4, the lower sweep section 57 supports the blade 18 on the ground, the back of the blade rests against the support arm 61, the mounting sleeves are positioned above a lower stop 59 on the vertical mounting posts 16, the lower edge of the lifting cam 31 is above the surface of the road, and the blade is in the proper position to push a load of snow.

Figure 5:
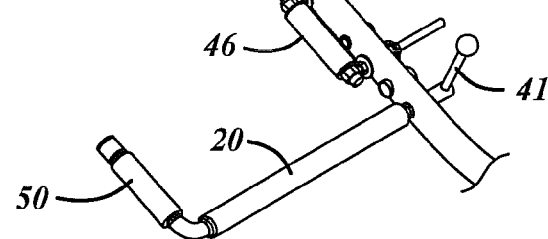
FIG. 5 is a side view of a plow implement when the implement is being driven in the reverse direction.

Turning now to FIG. 5, when the frame is driven in the backward direction as shown by the arrow 65, the drag of the ground on the lower sweep section 57 causes the blade 18 to tilt from the vertical position about the pivot 63 until the blade is in an inclined position and the lower surface of the lifting cam 31 comes into contact with the ground. Driving the frame further in the backward direction causes the lifting cam 31 to lift the sweep section 57 off the ground, allowing the blade to be pulled backward with less force and without dragging snow behind the blade. The height of the blade above the ground when the frame is pulled in the reverse direction can be adjusted by changing the radius or the dimension of the lifting cams 31.

The frame is mounted on the vehicle in the following way. The front wheels 26 of the vehicle are first oriented in a straight ahead direction. The latching rollers 38 and 50 on the ends of the support posts 34 and the drive posts 35 are rotated to the open position. This allows the support rollers 24 and the drive rollers 20 and 21 of each frame member 12 to be slid onto the vehicle wheels from the side of the vehicle. After one of the frame members has been mounted onto the wheel, the latching rollers 38 and 50 may be rotated to the latched position so that the support and drive rollers cannot be removed from the wheel. The other frame member is then mounted on the other vehicle wheel using the same procedure. After both frame members 12 have been mounted on the vehicle wheels, an implement such as a snow plow may be mounted onto the front vertical mounting posts 16. In order to remove the frame from a vehicle, the steps listed above are performed in the reverse order.

Figure 6:
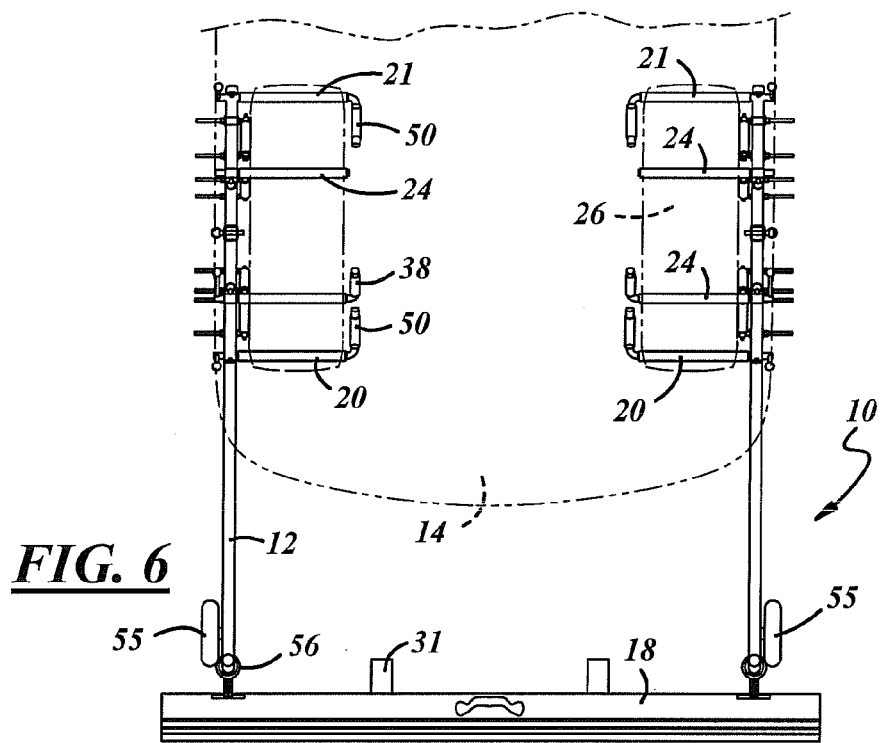
FIG. 6 is a plan view of a frame and a snow plow implement with the wheels of a vehicle pointing straight ahead.

FIG. 6 is a plan view of a frame 10 and a snow plow implement 18 with the vehicle wheels 26 pointing straight ahead. All of the latching rollers 38 and 50 have been rotated to the closed position, preventing removal of the frame from the wheels of the vehicle. Forward motion of the vehicle 14 causes the wheels to push on the front drive rollers 20. The drive rollers 20 rotate in response to the rotation of the vehicle wheels, and impart a forward driving motion to the frame 10 and the plow 18. The frame 10 is supported above the ground by the support wheels 55 in the front of the frame, and by the support rollers 24 that ride on the top of the vehicle wheels. The mounting sleeves 56 allow the plow 18 to move up and down on the vertical mounting posts 16 in response to varying heights of the road surface. In the event the vehicle needs to backup, the wheels 26 push on the rear drive rollers 21, and impart a rearward driving motion to the frame 10 and the plow 18.

Figure 7:
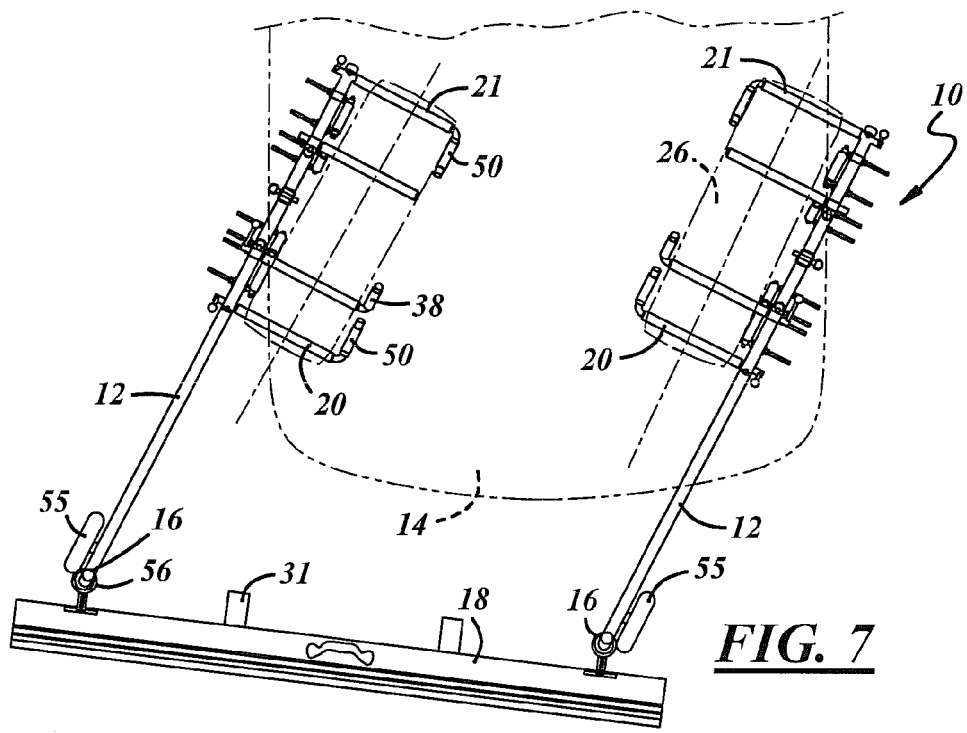
FIG. 7 is a plan view of a frame and a snow plow implement with the wheels of a vehicle turned to one side.

FIG. 7 is a plan view of a frame and a snow plow implement with the vehicle wheels 26 pointing to one side for a vehicle turn. Because the frame members 12 are mounted directly to the vehicle wheels 26, the frame members 12 swing to the side and follow the steering motion of the vehicle wheels. The sliding fit of the mounting sleeves 56 of the plow on the vertical mounting posts 16 allows the posts to pivot within the sleeves.

Many vehicles are designed with a front shock absorber or suspension strut that is vertically mounted in approximate alignment with the center of the front vehicle wheels. The frame design shown in FIGS. 1-7 allows the frame to be mounted on this type of vehicle because the support yoke 30 spaces the support rollers 24 so that they are not directly above the center 64 of the vehicle wheel.

Figure 8:
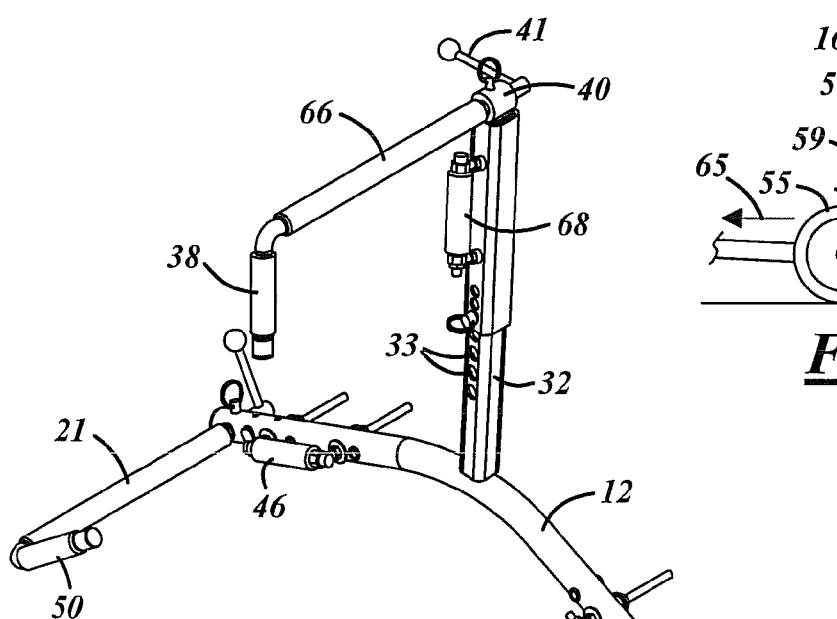
FIG. 8 is a detail view of portion of the frame of an alternate embodiment of the invention.

FIG. 8 shows an alternate frame design which designed for use on vehicles that do not have a front shock absorber or suspension strut in alignment the center of the front wheels. In this embodiment, a single support roller 66 that is approximate alignment of the center of the vehicle wheel is used, and a single spacing roller 68 is mounted vertically on the vertical frame member 32. Spacing rollers 46 are also mounted on the frame members 12 between the two drive rollers 20 and 21. This embodiment uses the same arrangement of two drive rollers 20 and 21 that contact the vehicle tire, and latching rollers 38 and 50 that secure the frame member 12 to the vehicle tire.

Figure 9:
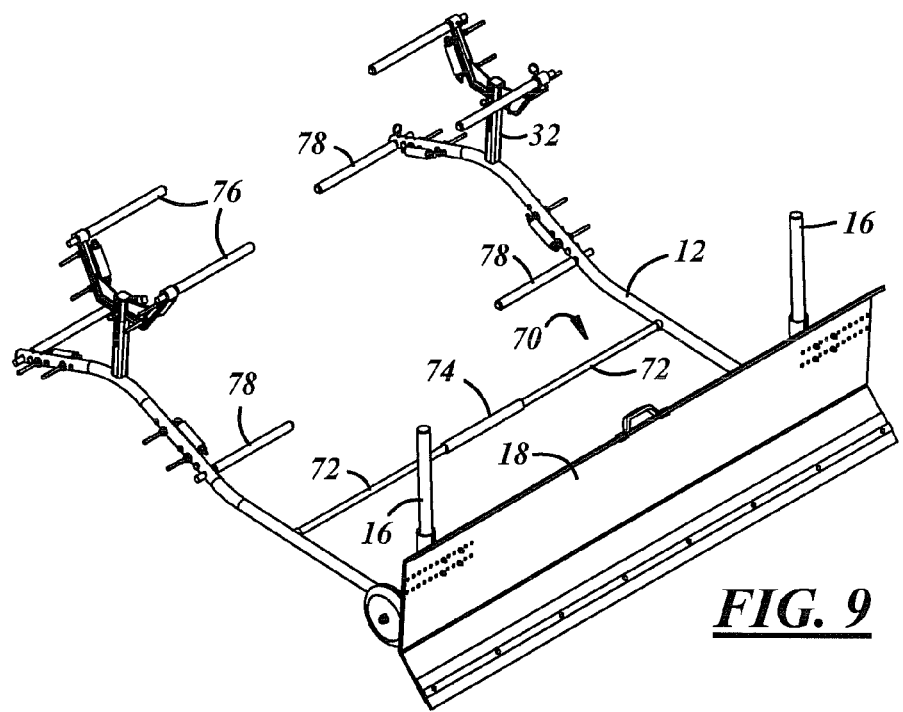
FIG. 9 is a perspective view of an alternate embodiment of the invention.

FIG. 9 shows an alternate embodiment in which a crossbar 70 is used to tie the two elongated frame members 12 together. A crossbar half 72 is mounted on each side of the frame and the two ends of the crossbar halves are coupled together by a coupling member 74. The crossbar 70 and the snow plow implement 18 maintain the spacing between the elongated frame members 12 to secure the frame to the vehicle wheels. In this embodiment, the support posts 76 and drive posts 78 do not include latching rollers. In order to mount this embodiment onto a vehicle, the two elongated frame members 12 are first mounted on the vehicle wheels, the coupling member 74 is then used to join the two crossbar halves 72 together, and a plow 18 or other implement is then mounted onto the vertical mounting posts 16. The crossbar 70 and the plow 18 hold the two elongated frame members 12 on the vehicle wheels.

Although the device has been shown in conjunction with an implement such as a snow plow, the device may be use to mount other implements to a vehicle. Such implements include, but are not limited to sweepers, aerators, mowers, load wagons, and any other devices that may be propelled by a vehicle. Likewise, although the vehicle shown in the embodiments is an automobile, the device is useable with other vehicles such as all terrain vehicles, jeeps, garden tractors, farm tractors, golf carts, and the like.

The device may also be mounted on the rear tires of a vehicle. When used in this way, an implement such as a plow, an aerator, a sweeper or other implement may be mounted on the frame. A bar with a hitch may also me mounted on the frame, and the hitch may be used to pull a wagon, a trailer, or other load carrying device.

Having thus described the invention, various modifications and alterations will occur to those skilled in the art, which modifications and alterations will be within the scope of the invention as defined by the appended claims.

What is claimed is:

1. A frame for mounting an implement to a vehicle having wheels, the frame comprising:
   elongated frame members for supporting the implement while allowing the vehicle wheels to remain on the ground;
   drive members mounted on the elongated frame members, whereby the drive members contact the wheels of the vehicle and receive a driving force from the wheels while the vehicle wheels remain on the ground, and whereby the frame is mounted to the vehicle only on the vehicle wheels;
   support members coupled to the frame, whereby the support members contact the wheels of the vehicle and provide support for the elongated frame members; and
   spacing rollers mounted on the frame members, the spacing rollers engaging the outer sidewalls of the vehicle tire to space the frame members from the vehicle tire.

2. The frame of claim 1 further comprising:
   latching members coupled to at least one of the drive members and the support members, the latching members engaging the sidewalls of the vehicle wheels to secure the frame to the vehicle wheels.

3. The frame of claim 1 further comprising:
   a drive post and a drive roller comprising each drive member, the drive rollers being rotatable relative to the drive posts, the vehicle wheels contacting the drive rollers to impart a driving force thereto.

4. The frame of claim 1 further comprising:
   support wheels mounted on the front of the elongated frame members, the support wheels and the support members in contact with the vehicle wheels comprising the only support for the frame.

5. The frame of claim 1 further comprising:
   front mounting posts on the front of the elongated frame members,
   an implement having mounting sleeves mounted on the front mounting posts, the mounting sleeves having a slideable fit on the front mounting posts, whereby the front mounting posts are able to pivot relative to the mounting sleeves so that the steering motion of the vehicle wheels results in the frame turning to follow the direction of the steering wheels, and whereby and the implement is able to slide vertically on the front mounting posts.

6. The frame of claim 1 further comprising:
   extendable bolts coupling the spacing rollers to the frame members, the extendable bolts allowing the spacing rollers to be moved toward or away from the frame members to adjust the spacing rollers to the width of the vehicle tires.

7. The frame of claim 3 further comprising:
   latching rollers on the ends of at least one of the drive rollers and at least one of the support members.

8. The frame of claim 1 further comprising:
   two drive rollers mounted on each elongated frame member, one drive roller engaging the front of the vehicle tire, and the other drive roller engaging the rear of the vehicle tire, whereby the vehicle tire is able to provide a driving force to the frame with the vehicle traveling in either the forward or the reverse direction.

9. The frame of claim 1 further comprising:
   frame posts mounted on the rear portion of the elongated frame members;
   a yoke mounted on the top of each of the frame posts;
   each support member comprising a support roller; and,
   two support rollers mounted on each yoke, whereby the elongated frame members are supported on the vehicle tires by the two support rollers on each of the yokes.

10. The frame of claim 7 further comprising:
    a control handle for rotating the latching rollers in an arc, whereby the latching rollers are able to rotate from a first position in which the latching rollers engage the sidewalls of the vehicle tire and prevent removal of the frame from the vehicle tire to a second position in which the latching rollers do not prevent removal of the frame from the vehicle tire.

11. The frame of claim 1 further comprising:
    an adjustable mounting on the elongated frame members for the drive members, whereby the position of the drive members on the elongated frame members can be adjusted for various sizes of vehicle tires.

12. The frame of claim 11 further comprising:
    a plurality of spaced drive member mounting holes on the elongated frame members comprising the adjustable mounting.

13. The frame of claim 1 further comprising:
    a crossbar extending from one elongated frame member to the other, whereby the crossbar and the implement maintain the spacing between the elongated frame members to secure the frame to the vehicle wheels.

14. The frame of claim 5 further comprising:
    lifting cams mounted near the lower edge of the implement, the lifting cams raising the lower edge of the implement in response to the implement being driven in the backward direction.

15. The frame of claim 14 further comprising:
    pivot connections coupling the implement to the mounting sleeves, the pivot connections allowing the implement to tilt relative to the mounting posts, whereby the lifting cams are raised off the ground when the implement is in a vertical orientation, and the lifting cams are in contact with the ground when the implement is in an inclined position.

16. The frame of claim 1 further comprising:
frame posts mounted on the rear portion of the elongated frame members;
a yoke mounted on the top of each of the frame posts;
each support member comprising a support roller; and,
at least one support roller mounted on each yoke, whereby the elongated frame members are supported on the vehicle tires by the at least one support roller on each of the yokes.

* * * * *